(12) United States Patent
Bourret et al.

(10) Patent No.: US 7,901,259 B2
(45) Date of Patent: Mar. 8, 2011

(54) METHOD OF INDICATING A DECELERATION OF A WATERCRAFT

(75) Inventors: Michel Bourret, Drummondville (CA); Andre Denis, Sherbrooke (CA); Marc Schuler, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 283 days.

(21) Appl. No.: 12/111,551

(22) Filed: Apr. 29, 2008

(65) Prior Publication Data
US 2009/0325431 A1 Dec. 31, 2009

(51) Int. Cl.
*B63H 19/00* (2006.01)
(52) U.S. Cl. .......................................... 440/41
(58) Field of Classification Search .............. 440/40–42, 440/38
See application file for complete search history.

(56) References Cited

U.S. PATENT DOCUMENTS

| 3,187,708 | A | * | 6/1965 | Fox ................................. 440/41 |
| 5,067,918 | A | * | 11/1991 | Kobayashi ....................... 440/39 |
| 5,474,007 | A | | 12/1995 | Kobayashi |
| 5,494,464 | A | | 2/1996 | Kobayashi et al. |
| 5,507,672 | A | | 4/1996 | Imaeda |
| 5,752,864 | A | | 5/1998 | Jones et al. |
| 5,755,601 | A | | 5/1998 | Jones |
| 5,934,954 | A | * | 8/1999 | Schott et al. ................... 440/41 |
| 6,045,418 | A | | 4/2000 | Roos |
| 6,113,443 | A | | 9/2000 | Eichinger |
| 6,234,100 | B1 | | 5/2001 | Fadeley et al. |
| 6,401,644 | B2 | | 6/2002 | Fadeley et al. |
| 6,453,835 | B2 | | 9/2002 | Fadeley et al. |
| 6,533,623 | B2 | | 3/2003 | Simard et al. |
| 6,547,611 | B1 | | 4/2003 | Boroos et al. |
| 6,676,462 | B2 | | 1/2004 | Yanagihara |
| 6,722,632 | B2 | | 4/2004 | Kenny et al. |
| 6,743,062 | B1 | | 6/2004 | Jones |
| 6,875,065 | B2 | | 4/2005 | Tsuchiya et al. |
| 6,905,378 | B2 | | 6/2005 | Uraki et al. |
| 7,195,527 | B2 | | 3/2007 | Tani et al. |
| 2003/0077954 | A1 | | 4/2003 | Fadelay et al. |
| 2008/0133075 | A1 | | 6/2008 | St-Pierre et al. |
| 2008/0182463 | A1 | | 7/2008 | St-Pierre et al. |
| 2008/0233811 | A1 | | 9/2008 | St-Pierre et al. |

FOREIGN PATENT DOCUMENTS
WO WO/2008/025169 A1 3/2008
* cited by examiner

*Primary Examiner* — Ed Swinehart
(74) *Attorney, Agent, or Firm* — Olser, Hoskin & Harcourt LLP

(57) ABSTRACT

A method of indicating a deceleration of a watercraft is disclosed. The method comprises creating a spray of water using a reverse gate of the watercraft. The spray of water extends above a water level of a body of water in which the watercraft operates. The spray of water is created when the reverse gate of the watercraft is in a lowered position and the watercraft is decelerating. An alternate method comprises creating a spray of water using a reverse gate of the watercraft only when decelerating the watercraft. A watercraft for carrying out at least one of the methods is also disclosed.

20 Claims, 17 Drawing Sheets

METHOD OF INDICATING A DECELERATION OF A WATERCRAFT

CROSS-REFERENCE

This application is related to U.S. patent application Ser. No. 12/021,796, filed Jan. 29, 2008, the entirety of which is incorporated herein by reference.

FIELD OF THE INVENTION

The present invention relates to a method of indicating a deceleration of a watercraft.

BACKGROUND OF THE INVENTION

There exist many different ways to propel watercraft. One way is to use what is known as a jet propulsion system which is powered by an engine of the watercraft. The jet propulsion system typically consists of a jet pump which pressurizes water from the body of water and expels it through a venturi as a jet rearwardly of the watercraft to create thrust. Usually, a steering nozzle is pivotally mounted rearwardly of the venturi. The steering nozzle is operatively connected to a steering assembly of the watercraft which causes it to turn left or right to redirect the jet of water and thereby steer the watercraft.

In order to reduce the speed of such watercraft, a driver of the watercraft must release the throttle lever, thereby reducing the engine speed, and the drag created by the hull of the watercraft in the water gradually reduces the speed. In order to improve the deceleration of the watercraft, various systems have been devised. One such system consists in lowering plates connected to the transom of the hull which then extend below the hull and therefore increase the drag as described in U.S. Pat. No. 7,007,621, issued Mar. 7, 2006.

Road vehicles are typically equipped with brake lights that turn on when the driver brakes the vehicle. This indicates to drivers of surrounding vehicles that the vehicle is decelerating. Although a watercraft could in theory be equipped with similar "brake" lights that would turn on when the watercraft decelerates as indicated above, such lights would prove less efficient than on road vehicles. The reason for this is that watercraft, especially leisure watercraft such as jet boats and personal watercraft, are mostly used in sunny weather and the light from the sun combined with the reflective glare from the body of water in which the watercraft operates would make the "brake" light difficult to see.

Therefore, there is a need for a method of indicating a deceleration of the watercraft.

SUMMARY OF THE INVENTION

It is an object of the present invention to ameliorate at least some of the inconveniences present in the prior art.

It is also an object of the present invention to provide a method whereby a spray of water that extends above a water level of a body of water in which a watercraft operates when the watercraft is decelerating. The spray of water is easily noticeable to users of surrounding watercraft and therefore can provide a visual indicator for, in this case, deceleration of the watercraft.

It is also an object of the present invention to provide a watercraft that can create the spray of water.

In one aspect the invention provide a method of indicating a deceleration of a watercraft comprising creating a spray of water using a reverse gate of the watercraft. The spray of water extends above a water level of a body of water in which the watercraft operates. The spray of water is created when the reverse gate of the watercraft is in a lowered position and the watercraft is decelerating.

In an additional aspect, creating the spray of water includes deflecting water from the body of water.

In a further aspect, when the reverse gate of the watercraft is in the lowered position, the reverse gate redirects a jet of water expelled from a jet pump of the watercraft.

In an additional aspect, deflecting water from the body of water includes causing the water to flow over a deflector connected to an outer surface of the reverse gate and disposed below the water level when the reverse gate is in the lowered position.

In a further aspect, deflecting water from the body of water further includes causing the water to flow over a portion of the outer surface of the reverse gate after flowing over the deflector.

In an additional aspect, deflecting the water flowing over the portion of the outer surface of the reverse gate rearwardly of the watercraft such that the spray of water extends away from a rear of the watercraft.

In a further aspect, the watercraft extends a first distance vertically above the body of water, and the spray of water extends a second distance vertically above the body of water. The second distance is greater than the first distance during at least a portion of the deceleration of the watercraft.

In an additional aspect, the second distance is at least twice the first distance during the portion of the deceleration of the watercraft.

In a further aspect, a height of the water spray vertically above the body of water is proportional to a speed of the watercraft.

In an additional aspect, the spray of water extends behind the watercraft.

In a further aspect, the spray of water extends generally vertically.

In an additional aspect, water forming the spray of water never enters a volume formed between a hull and a deck of the watercraft.

In another aspect, the invention provides a method of indicating a deceleration of a watercraft comprising creating a spray of water using a reverse gate of the watercraft. The spray of water extends above a water level of a body of water in which the watercraft operates. The water spray is created only when decelerating the watercraft.

In a further aspect, creating the spray of water includes deflecting water from the body of water.

In an additional aspect, the method further comprises pivoting the reverse gate of the watercraft to a lowered position where the reverse gate redirects a jet of water expelled from a jet pump of the watercraft.

In a further aspect, deflecting water from the body of water includes causing the water to flow over a deflector connected to an outer surface of the reverse gate and disposed below the water level when the reverse gate is in the lowered position.

In an additional aspect, the watercraft extends a first distance vertically above the body of water, and the spray of water extends a second distance vertically above the body of water. The second distance is greater than the first distance during at least a portion of the deceleration of the watercraft.

In a further aspect, a height of the water spray vertically above the body of water is proportional to a speed of the watercraft.

In an additional aspect, the spray of water extends generally vertically behind the watercraft.

In yet another aspect, the invention provides a watercraft having a hull and a deck. The hull has a transom. The deck is disposed on the hull. An engine is disposed between the hull and the deck. A propulsion system is operatively connected to the engine. The propulsion system has a reverse gate. The reverse gate creates a water spray extending rearwardly of the transom above a water level of a body of water in which the watercraft operates. The spray of water is created when the reverse gate of the watercraft is in a lowered position and the watercraft is decelerating.

For purposes of this application, terms related to spatial orientation such as forwardly, rearwardly, left, and right, are as they would normally be understood by a driver of the watercraft sitting thereon in a normal driving position. It should be understood that terms related to spatial orientation when referring to the reverse gate alone, such as "upper portion" and "lower portion" should be understood as they would normally be understood when the reverse gate is installed on a watercraft and is disposed in the fully lowered position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

The present invention will be described with respect to a personal watercraft and a jet boat. However, it should be understood that other types of watercraft are contemplated.

The general construction of a personal watercraft 10 in accordance with this invention will be described with respect to FIGS. 1-6. The following description relates to one way of manufacturing a personal watercraft. Obviously, those of ordinary skill in the watercraft art will recognize that there are other known ways of manufacturing and designing watercraft and that this invention would encompass other known ways and designs.

Figure 1:
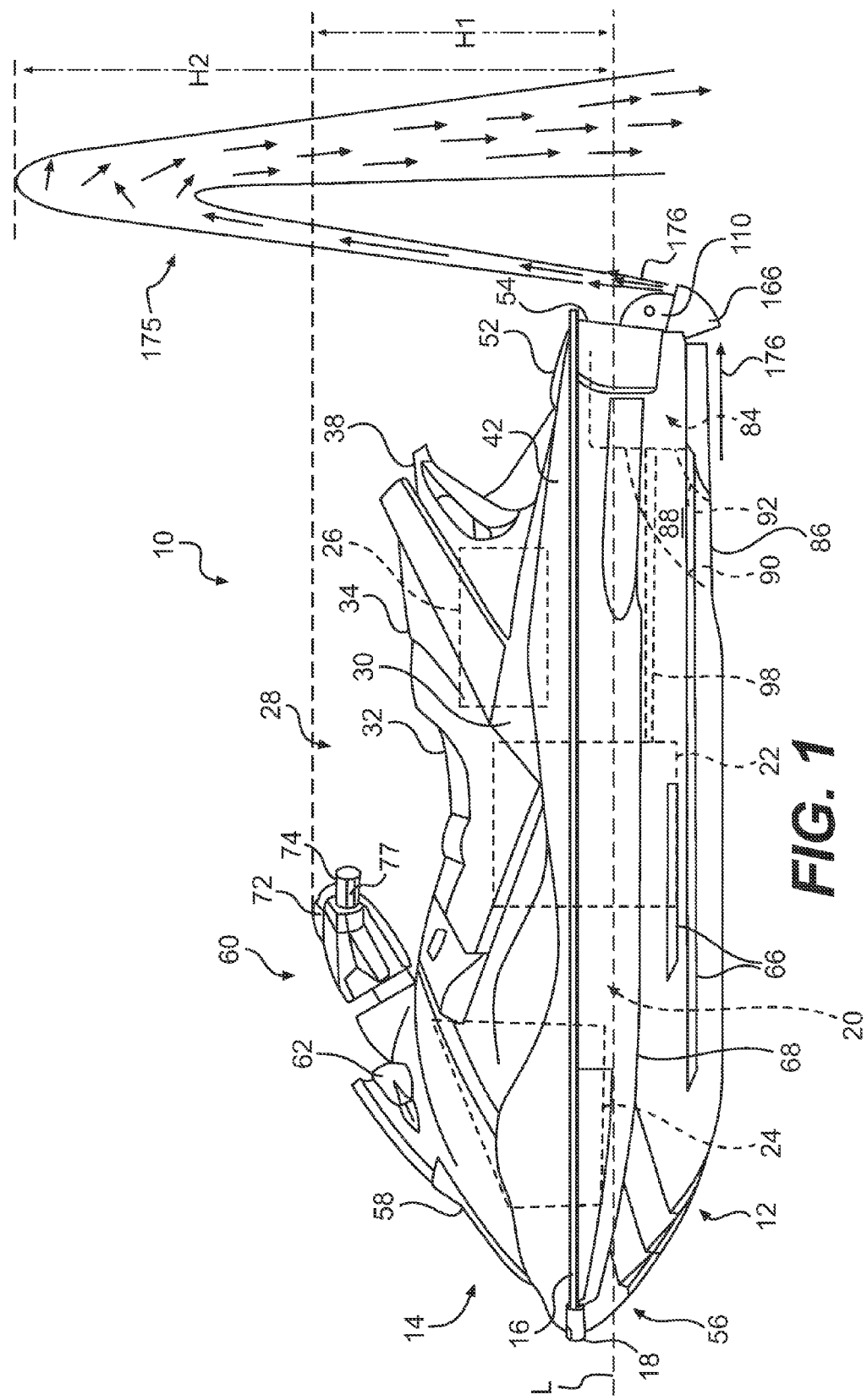
FIG. 1 illustrates a left side view of a personal watercraft in accordance with the invention.

The watercraft 10 of FIG. 1 includes a hull 12 and a deck 14. The hull 12 buoyantly supports the watercraft 10 in the water. The deck 14 is designed to accommodate a rider and, in some watercraft, one or more passengers. The hull 12 and deck 14 are joined together at a seam 16 that joins the parts in a sealing relationship. Preferably, the seam 16 comprises a bond line formed by an adhesive. Of course, other known joining methods could be used to sealingly engage the parts together, including but not limited to thermal fusion, molding or fasteners such as rivets or screws. A bumper 18 generally covers the seam 16, which helps to prevent damage to the outer surface of the watercraft 10 when the watercraft 10 is docked, for example. The bumper 18 can extend around the bow 56, as shown, or around any portion or all of the seam 16.

The space between the hull 12 and the deck 14 forms a volume commonly referred to as the engine compartment 20 (shown in phantom). Shown schematically in FIG. 1, the engine compartment 20 accommodates an engine 22, as well as a muffler, tuning pipe, gas tank, electrical system (battery, electronic control unit, etc.), air box, storage bins 24, 26, and other elements required or desirable in the watercraft 10.

Figure 2:
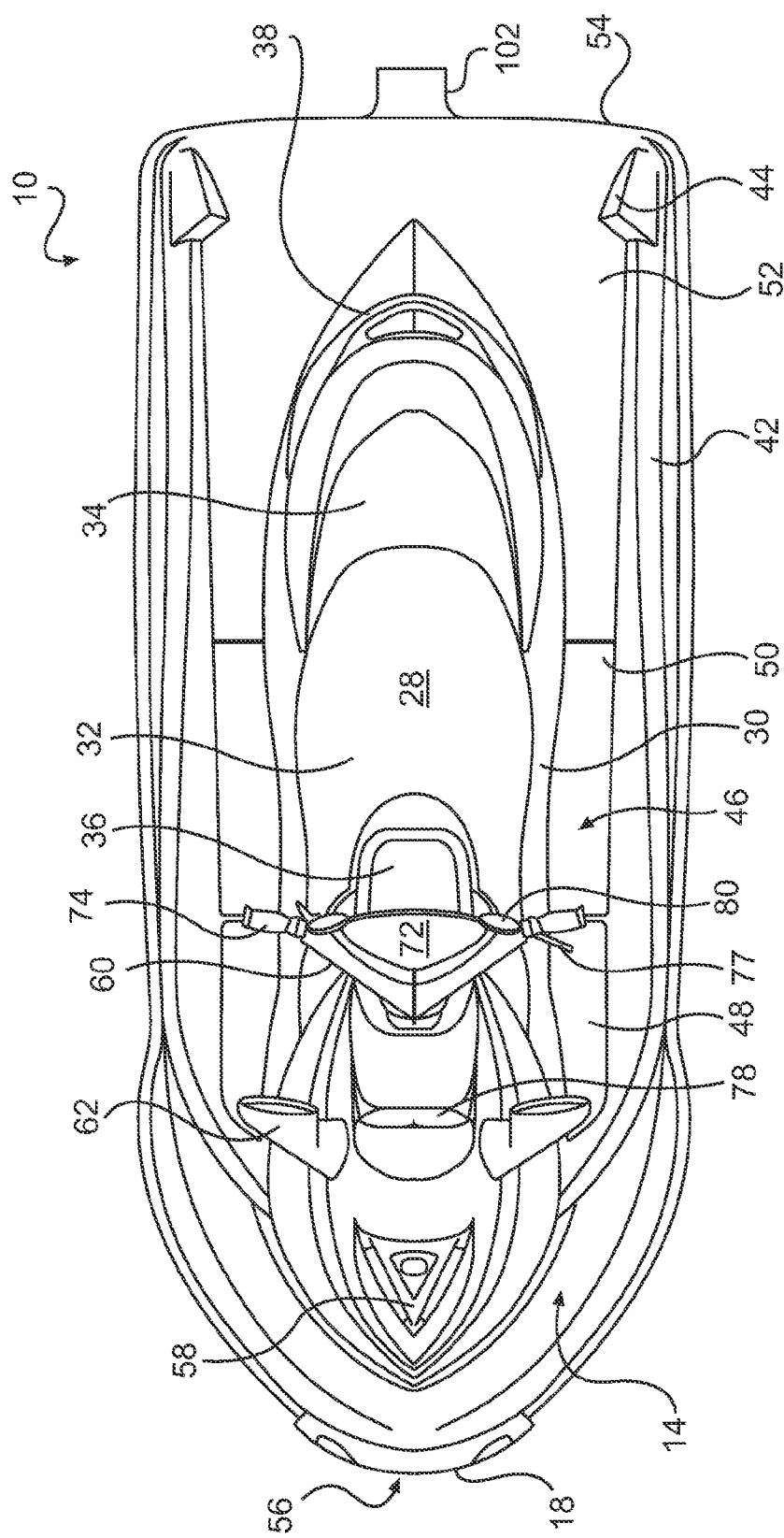
FIG. 2 is a top view of the watercraft of FIG. 1.

As seen in FIGS. 1 and 2, the deck 14 has a centrally positioned straddle-type seat 28 positioned on top of a pedestal 30 to accommodate one or more riders in a straddling position. As seen in FIG. 2, the seat 28 includes a first, front seat portion 32 and a rear, raised seat portion 34. The seat 28 is preferably made as a cushioned or padded unit or interfitting units. The first and second seat portions 32, 34 are removably attached to the pedestal 30 by a hook and tongue assembly (not shown) at the front of each seat and by a latch assembly (not shown) at the rear of each seat, or by any other known attachment mechanism. The seat portions 32, 34 can be individually tilted or removed completely. One of the seat portions 32, 34 covers an engine access opening (in this case above engine 22) defined by a top portion of the pedestal 30 to provide access to the engine 22 (FIG. 1). The other seat portion (in this case portion 34) covers a removable storage box 26 (FIG. 1). A "glove compartment" or small storage box 36 is provided in front of the seat 28.

Figure 4:
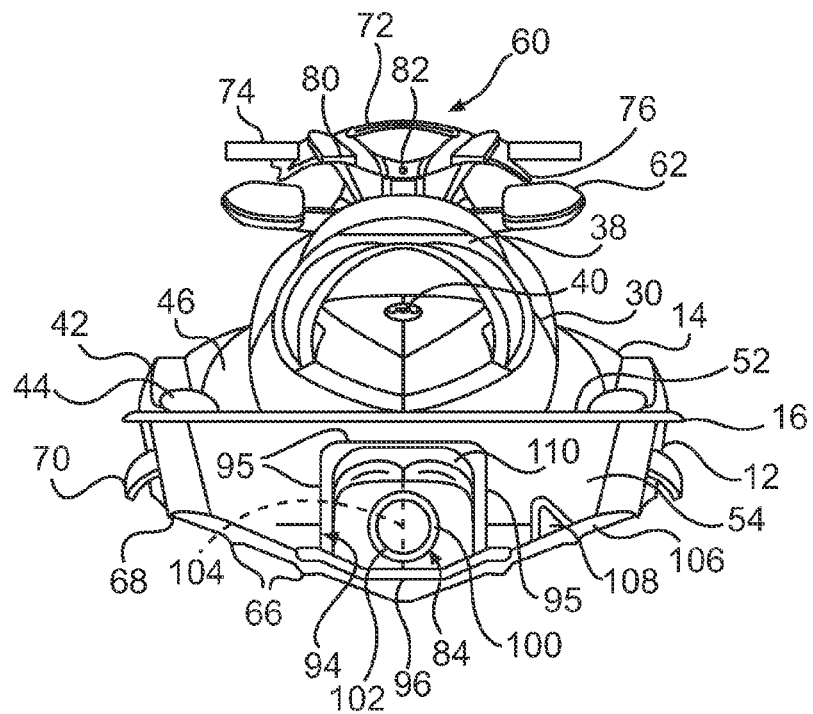
FIG. 4 is a back view of the watercraft of FIG. 1.

As seen in FIG. 4, a grab handle 38 is provided between the pedestal 30 and the rear of the seat 28 to provide a handle onto which a passenger may hold. This arrangement is particularly convenient for a passenger seated facing backwards for spotting a water skier, for example. Beneath the handle 38, a tow hook 40 is mounted on the pedestal 30. The tow hook 40 can be used for towing a skier or floatation device, such as an inflatable water toy.

As best seen in FIGS. 2 and 4 the watercraft 10 has a pair of generally upwardly extending walls located on either side of the watercraft 10 known as gunwales or gunnels 42. The gunnels 42 help to prevent the entry of water in the footrests 46 of the watercraft 10, provide lateral support for the rider's feet, and also provide buoyancy when turning the watercraft 10, since personal watercraft roll slightly when turning. Towards the rear of the watercraft 10, the gunnels 42 extend inwardly to act as heel rests 44. A passenger riding the watercraft 10 facing towards the rear, to spot a water-skier for example, can place his or her heels on the heel rests 44, thereby providing a more stable riding position. Heel rests 44 could also be formed separately from the gunnels 42.

Located on both sides of the watercraft 10, between the pedestal 30 and the gunnels 42 are the footrests 46. The footrests 46 are designed to accommodate a rider's feet in various riding positions. To this effect, the footrests 46 each have a forward portion 48 angled such that the front portion of the forward portion 48 (toward the bow 56 of the watercraft 10) is higher, relative to a horizontal reference point, than the rear portion of the forward portion 48. The remaining portions of the footrests 46 are generally horizontal. Of course, any contour conducive to a comfortable footrest for the rider could be used. The footrests 46 are covered by carpeting 50 made of a rubber-type material, for example, to provide additional comfort and traction for the feet of the rider.

A reboarding platform 52 is provided at the rear of the watercraft 10 on the deck 14 to allow the rider or a passenger to easily reboard the watercraft 10 from the water. Carpeting or some other suitable covering covers the reboarding platform 52. A retractable ladder (not shown) may be affixed to the transom 54 to facilitate boarding the watercraft 10 from the water onto the reboarding platform 52.

Figure 3:
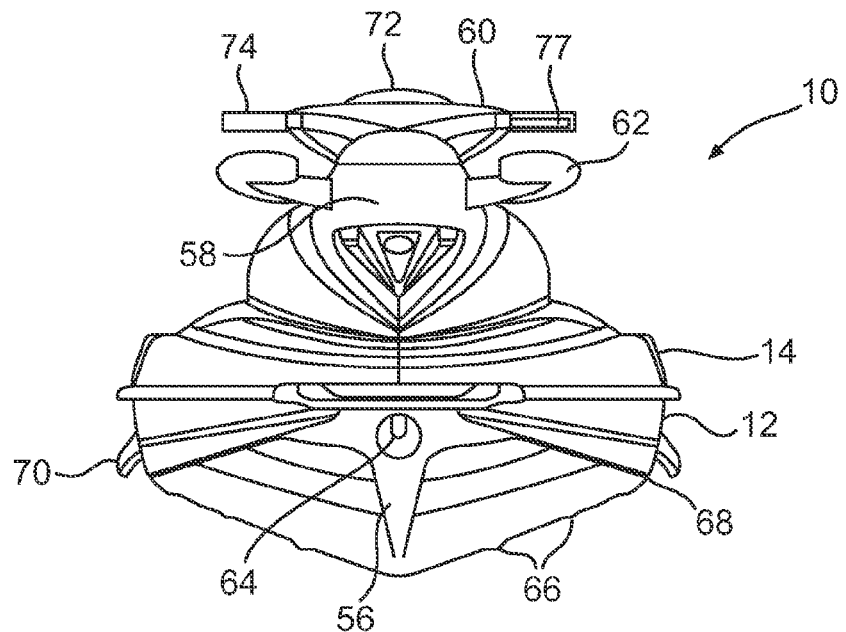
FIG. 3 is a front view of the watercraft of FIG. 1.

Referring to the bow 56 of the watercraft 10, as seen in FIG. 2 and 3, the watercraft 10 is provided with a hood 58 located forwardly of the seat 28 and a steering assembly including a helm assembly 60. A hinge (not shown) is attached between a forward portion of the hood 58 and the deck 14 to allow the hood 58 to move to an open position to provide access to the front storage bin 24 (FIG. 1). A latch (not shown) located at a rearward portion of the hood 58 locks the hood 58 into a closed position. When in the closed position, hood 58 prevents water from entering front storage bin 24. Rearview mirrors 62 are positioned on either side of the hood 58 to allow the rider to see behind the watercraft 10. A hook 64 is located at the bow 56 of the watercraft 10. The hook 64 is used to attach the watercraft 10 to a dock when the watercraft is not in use or to attach to a winch when loading the watercraft 10 on a trailer, for instance.

Figure 5:
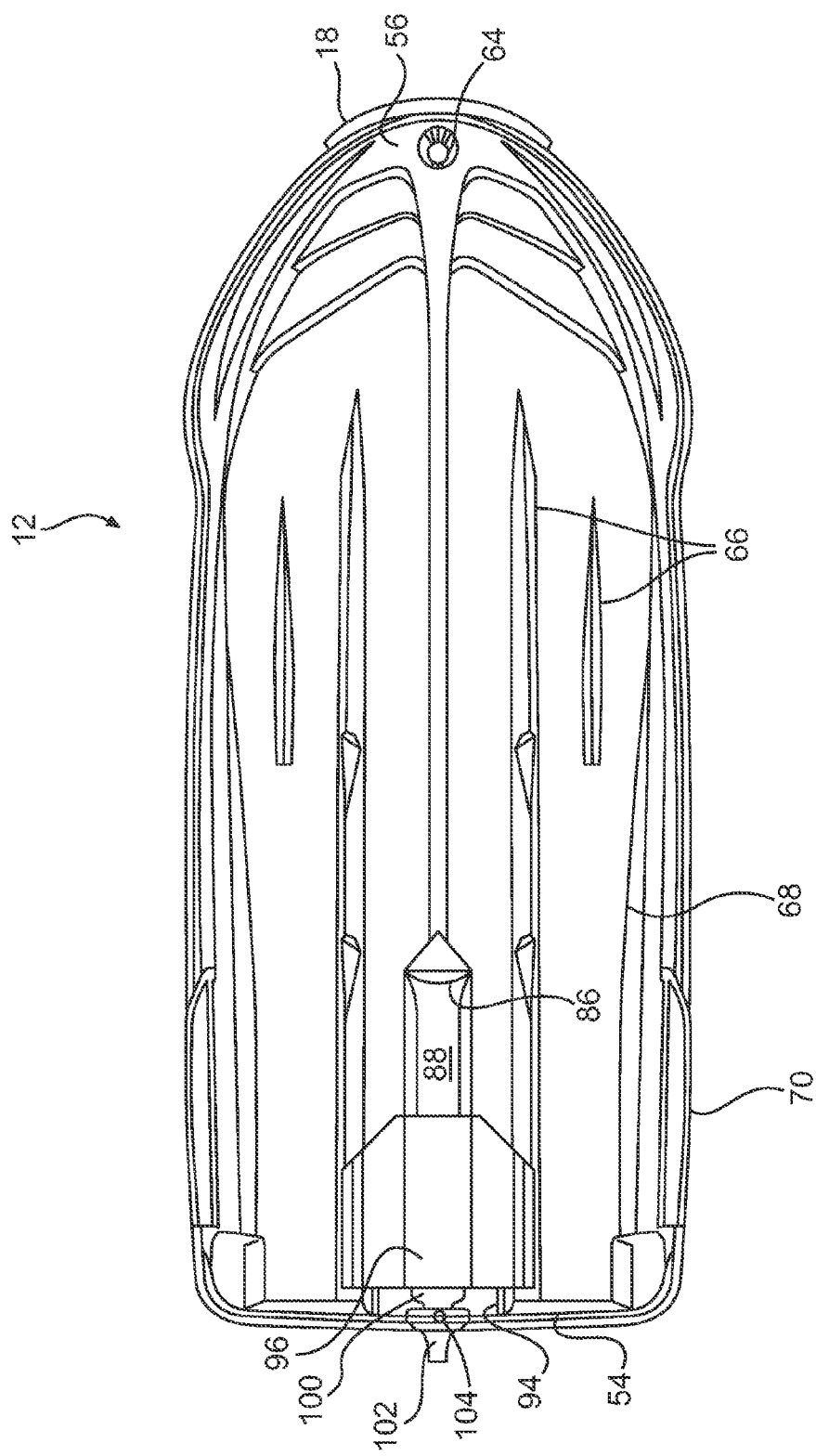
FIG. 5 is a bottom view of the hull of the watercraft of FIG. 1.

As best seen in FIGS. 3, 4, and 5, the hull 12 is provided with a combination of strakes 66 and chines 68. A strake 66 is a protruding portion of the hull 12. A chine 68 is the vertex formed where two surfaces of the hull 12 meet. The combination of strakes 66 and chines 68 provides the watercraft 10 with its riding and handling characteristics.

Sponsons 70 are located on both sides of the hull 12 near the transom 54. The sponsons 70 preferably have an arcuate undersurface that gives the watercraft 10 both lift while in motion and improved turning characteristics. The sponsons 70 are preferably fixed to the surface of the hull 12 and can be attached to the hull by fasteners or molded therewith. Sometimes it may be desirable to adjust the position of the sponson 70 with respect to the hull 12 to change the handling characteristics of the watercraft 10 and accommodate different riding conditions.

As best seen in FIGS. 3 and 4, the helm assembly 60 is positioned forwardly of the seat 28. The helm assembly 60 has a central helm portion 72, that may be padded, and a pair of steering handles 74, also referred to as a handlebar. One of the steering handles 74 is preferably provided with a throttle operator 76, which allows the rider to control the engine 22, and therefore the speed of the watercraft 10. The throttle operator 76 can be in the form of a thumb-actuated throttle lever (as shown), a finger-actuated throttle lever, or a twist grip. The throttle operator 76 is movable between an idle position and multiple actuated positions. The throttle operator 76 is preferably biased towards the idle position, such that when the driver of the watercraft lets go of the throttle operator 76, it will move to the idle position. The other of the steering handles 74 may be provided with a lever 77 used by the driver to control the jet propulsion system 84 as described in greater detail below.

As seen in FIG. 2, a display area or cluster 78 is located forwardly of the helm assembly 60. The display cluster 78 can be of any conventional display type, including a liquid crystal display (LCD), dials or LEDs (light emitting diodes). The central helm portion 72 has various buttons 80, which could alternatively be in the form of levers or switches, that allow the rider to modify the display data or mode (speed, engine rpm, time . . . ) on the display cluster 78. Buttons 80 may be also used by the driver to control the jet propulsion system 84 as described in greater detail below.

The helm assembly 60 also has a key receiving post 82, preferably located near a center of the central helm portion 72. The key receiving post 82 is adapted to receive a key (not shown) that starts the watercraft 10. As is known, the key is typically attached to a safety lanyard (not shown). It should be noted that the key receiving post 82 may be placed in any suitable location on the watercraft 10.

Returning to FIGS. 1 and 6, the watercraft 10 is generally propelled by a jet propulsion system 84. As is known, the jet propulsion system 84 pressurizes water to create thrust. The water is first scooped from under the hull 12 through an inlet 86, which preferably has an inlet grate (not shown in detail). The inlet grate prevents large rocks, weeds, and other debris from entering the jet propulsion system 84, which may damage the system or negatively affect performance. Water flows from the inlet 86 through a water intake ramp 88. The top portion 90 of the water intake ramp 88 is formed by the hull 12, and a ride shoe (not shown in detail) forms its bottom portion 92. Alternatively, the intake ramp 88 may be a single piece or an insert to which the jet propulsion system 84 attaches. In such cases, the intake ramp 88 and the jet propulsion system 84 are attached as a unit in a recess in the bottom of hull 12.

Figure 6:
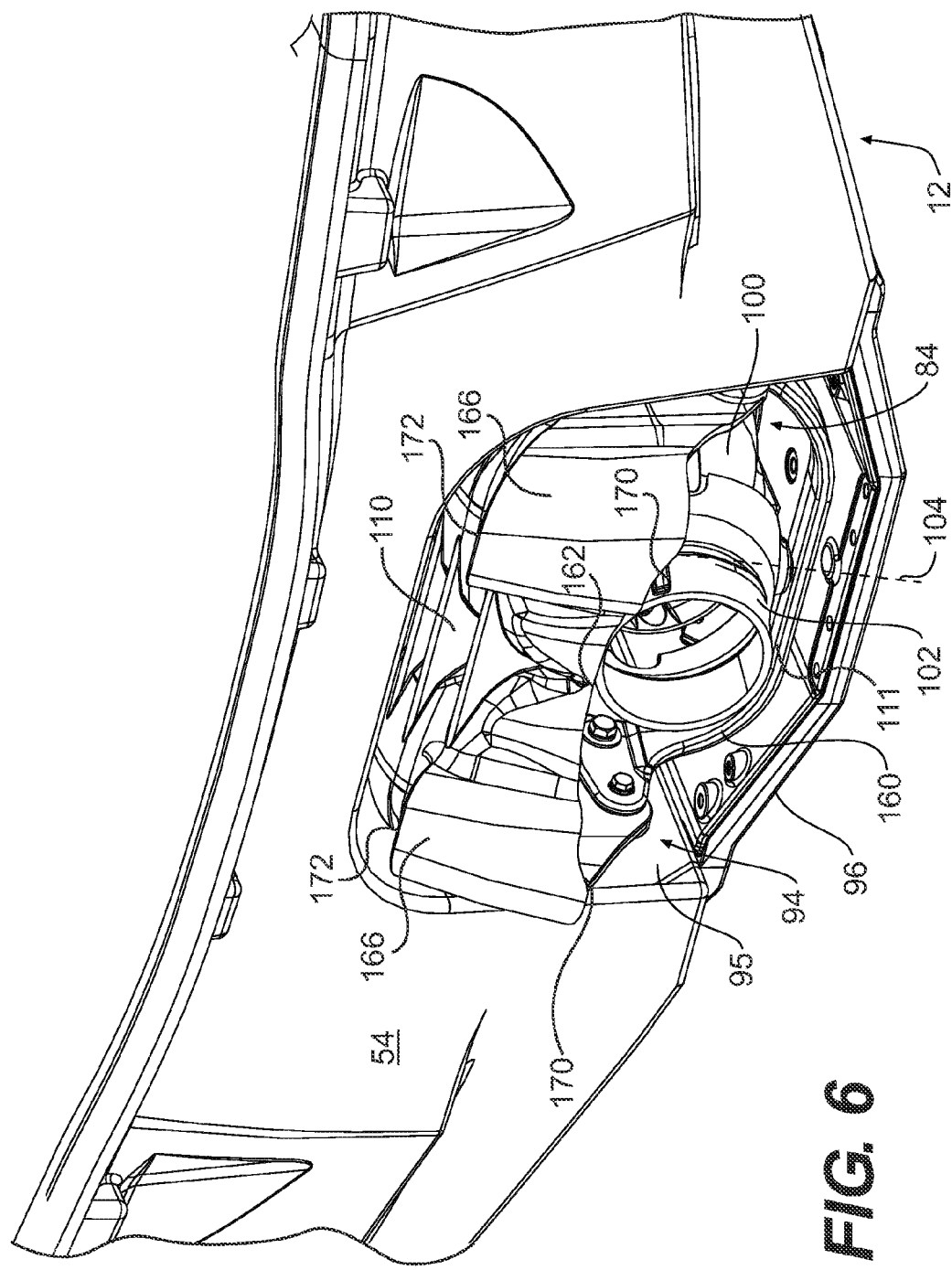
FIG. 6 is a perspective view, taken from a rear, right side, of a transom of the personal watercraft of FIG. 1.

From the intake ramp 88, water enters the jet propulsion system 84. As seen in FIG. 6, the jet propulsion system 84 is located in a formation in the hull 12, referred to as the tunnel 94. The tunnel 94 is defined at the front, sides, and top by walls 95 formed by the hull 12 and is open at the transom 54. The bottom of the tunnel 94 is closed by a ride plate 96. The ride plate 96 creates a surface on which the watercraft 10 rides or planes at high speeds.

Figure 9:
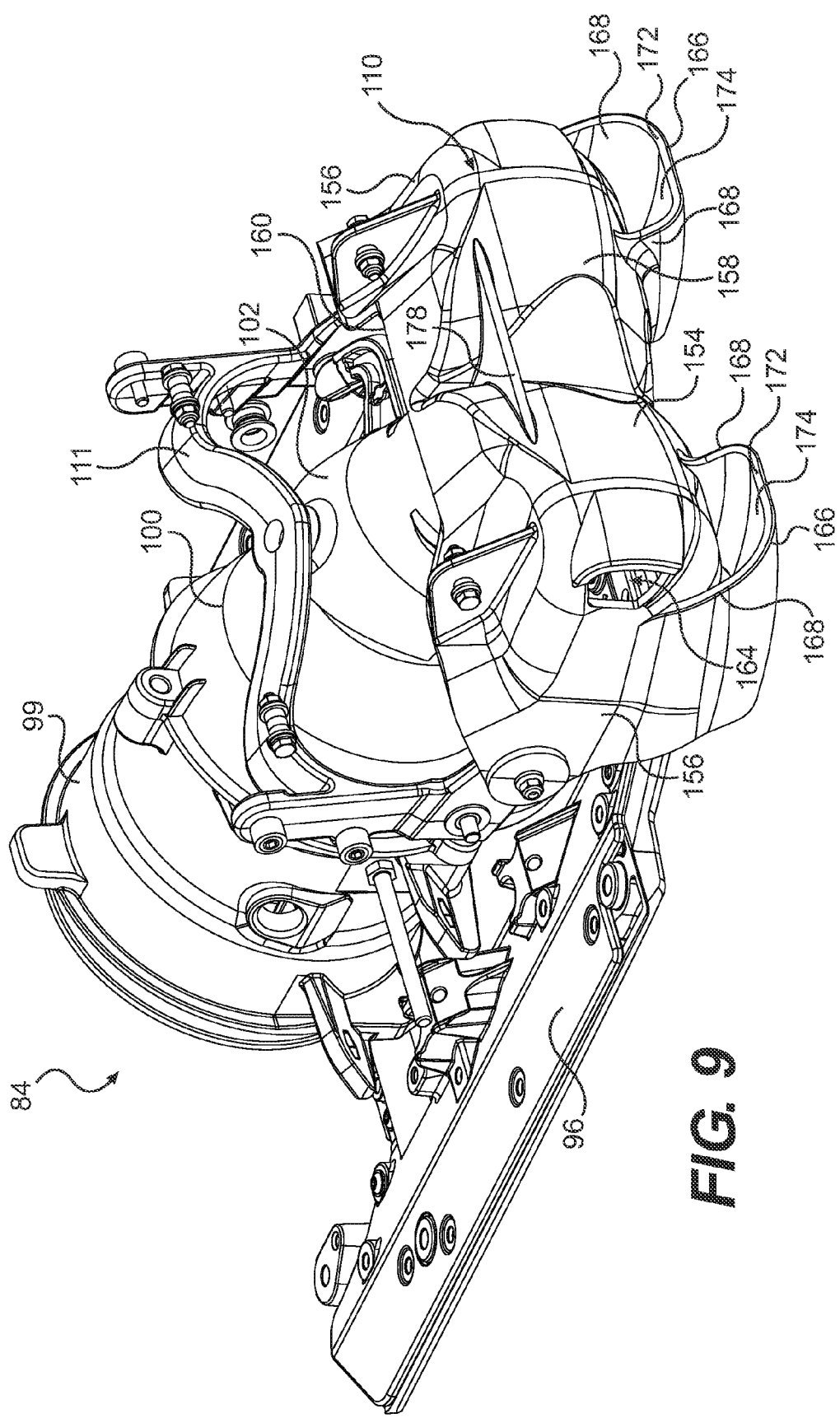
FIG. 9 is a perspective view taken from a rear, left side of a jet propulsion system of the watercraft of FIG. 1 having a first embodiment of a reverse gate.

The jet propulsion system 84 includes a jet pump 99 (FIG. 9). The forward end of the jet pump 99 is connected to the front wall 95 of the tunnel 94. The jet pump 99 includes an impeller (not shown) and a stator (not shown). The impeller is coupled to the engine 22 by one or more shafts 98, such as a driveshaft and an impeller shaft. The rotation of the impeller pressurizes the water, which then moves over the stator that is made of a plurality of fixed stator blades (not shown). The role of the stator blades is to decrease the rotational motion of the water so that almost all the energy given to the water is used for thrust, as opposed to swirling the water. Once the water leaves the jet pump 99, it goes through a venturi 100 that is connected to the rearward end of the jet pump 99. Since the venturi's exit diameter is smaller than its entrance diameter, the water is accelerated further, thereby providing more thrust. A steering nozzle 102 is rotationally mounted relative to the venturi 100, as described in greater detail below, so as to pivot about a steering axis 104.

The steering nozzle 102 is operatively connected to the helm assembly 60 preferably via a push-pull cable (not shown) such that when the helm assembly 60 is turned, the steering nozzle 102 pivots about the steering axis 104. This movement redirects the pressurized water coming from the venturi 100, so as to redirect the thrust and steer the watercraft 10 in the desired direction.

Figure 10:
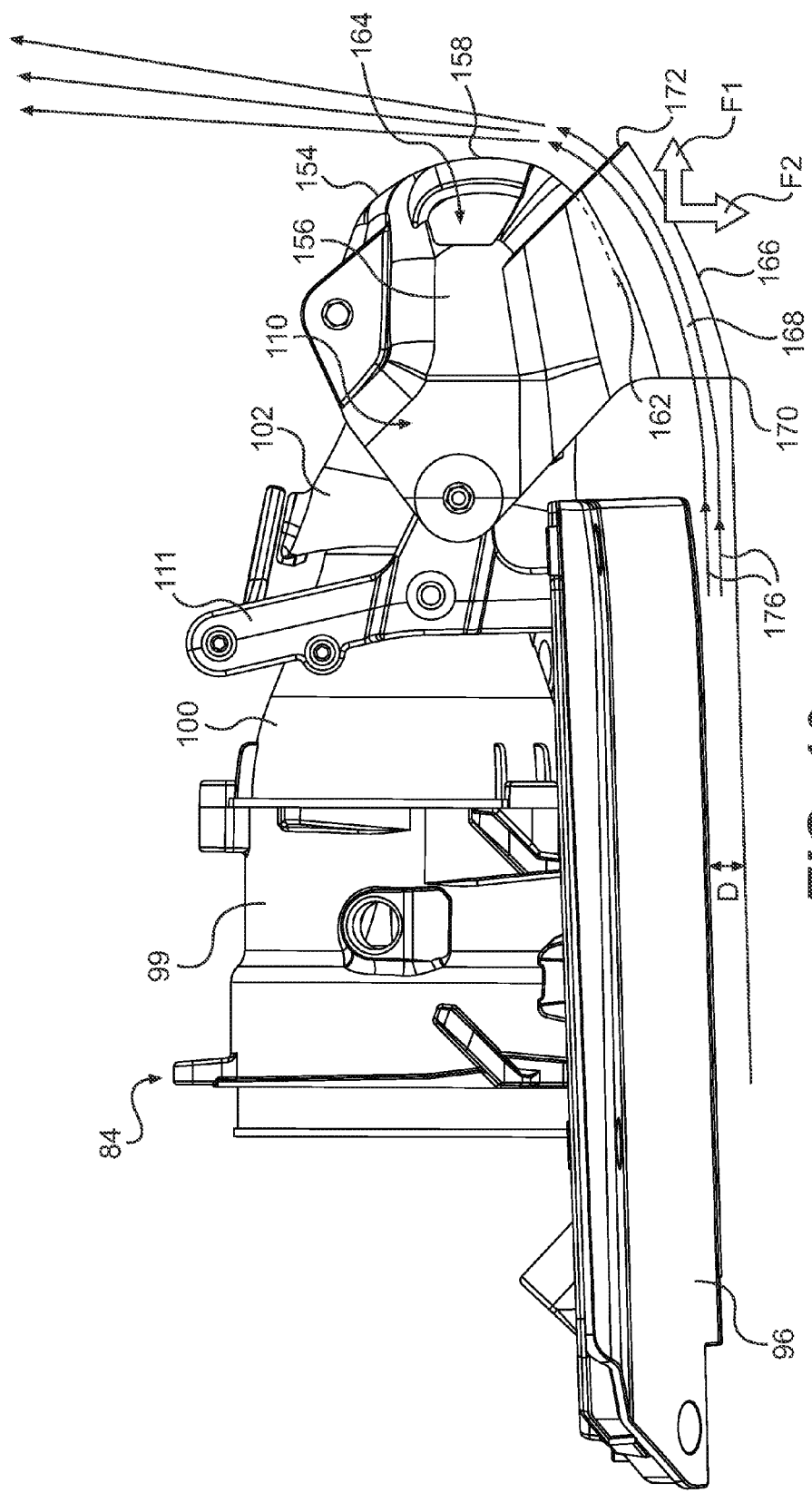
FIG. 10 is a left side view of the jet propulsion system of FIG. 9.

The jet propulsion system 84 is provided with a reverse gate 110 which is pivotable between a fully stowed position where it does not interfere with a jet of water being expelled by the steering nozzle 102, as seen in FIG. 6, and a fully lowered position where it redirects the jet of water being expelled by the steering nozzle 102, as seen in FIG. 9. The fully stowed and fully lowered positions should be understood as being the rotational limits that can be reached by the reverse gate 110 by pivoting in one direction or the other. For example, as seen from the left side of the watercraft 10 (i.e. as seen in FIG. 10), the fully stowed position is the rotational limit that can be reached by the reverse gate 110 by pivoting it counter-clockwise and the fully lowered position is the rotational limit that can be reached by the reverse gate 110 by pivoting it clockwise. The reverse gate 110 also has a plurality of positions intermediate the stowed and fully lowered positions where it will also redirect the jet of water being expelled by the steering nozzle 102. The specific construction of the reverse gate 110 will be described in greater detail below. The reverse gate 110 is pivotally mounted to a bracket 111. The bracket 111 is pivotally connected to the venturi 100. The steering nozzle is pivotally connected to the bracket 111 about the steering axis 104. It is contemplated that the reverse gate 110 could alternatively be pivotally mounted directly to the venturi 100, the jet pump 99, the nozzle 102, or the side walls 95 of the tunnel 94.

When the watercraft 10 is moving, its speed is measured by a speed sensor 106 attached to the transom 54 of the watercraft 10. The speed sensor 106 has a paddle wheel 108 that is turned by the water flowing past the hull 12. In operation, as the watercraft 10 goes faster, the paddle wheel 108 turns faster in correspondence. An electronic control unit (ECU) (not shown) connected to the speed sensor 106 converts the rotational speed of the paddle wheel 108 to the speed of the watercraft 10 in kilometers or miles per hour, depending on the rider's preference. The speed sensor 106 may also be placed in the ride plate 96 or at any other suitable position. Other types of speed sensors, such as pitot tubes, and processing units could be used, as would be readily recognized by one of ordinary skill in the art. Alternatively, a global positioning system (GPS) unit could be used to determine the speed of the watercraft 10 by calculating the change in position of the watercraft 10 over a period of time based on information obtained from the GPS unit.

Figure 7:
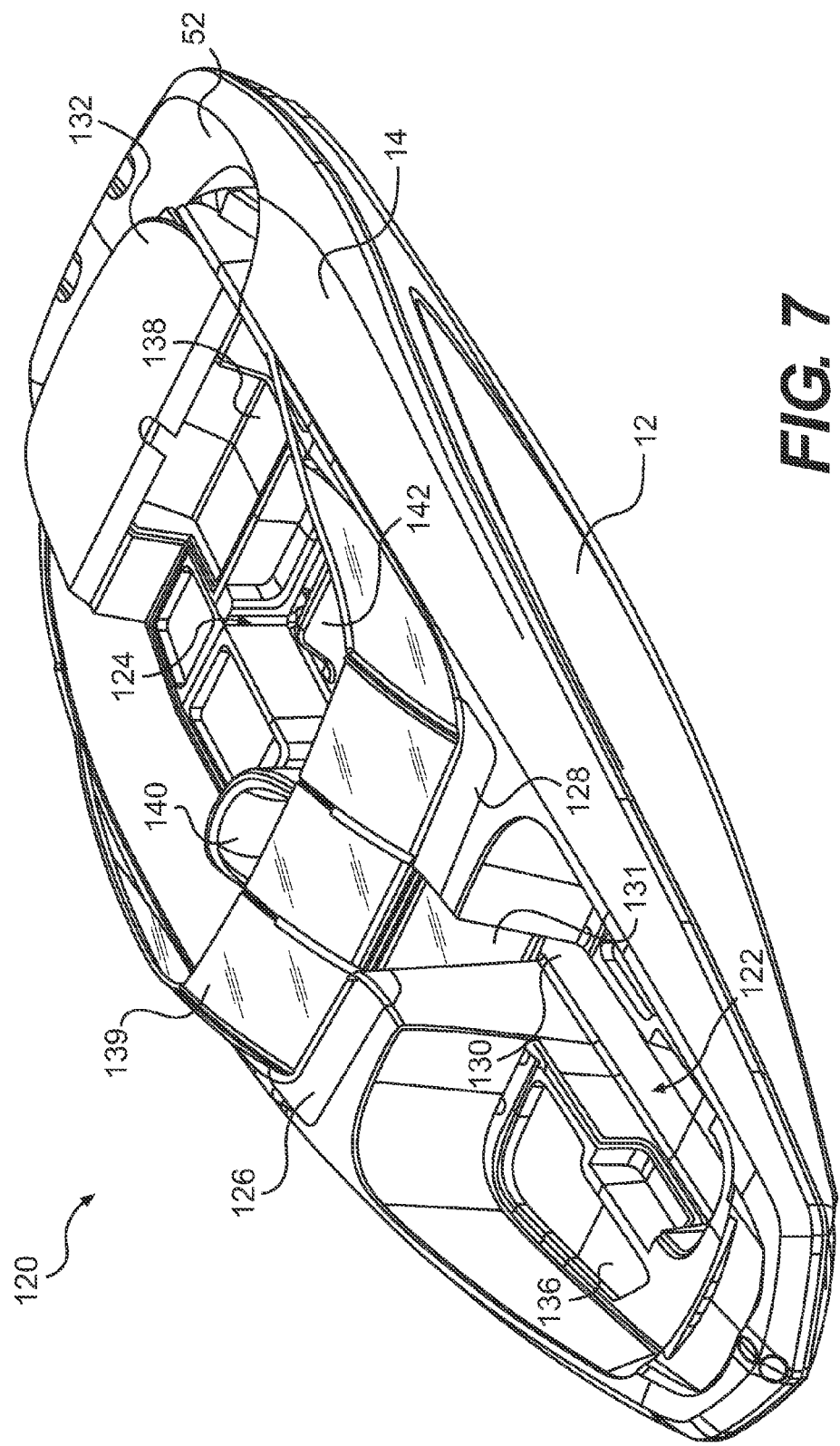
FIG. 7 is a perspective view, taken from a front, left side, of a jet boat in accordance with the invention.
Figure 8:
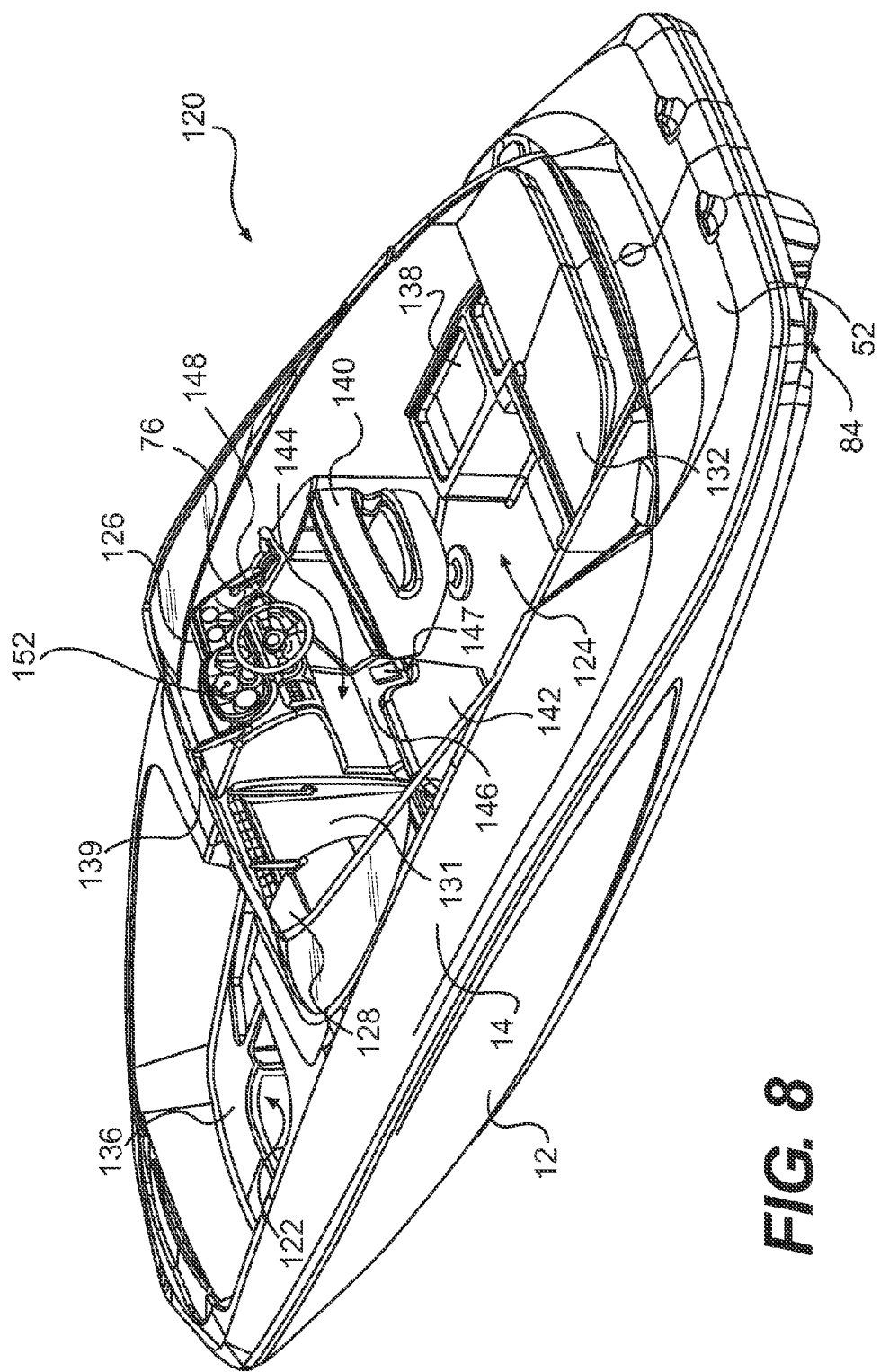
FIG. 8 is a perspective view, taken from a rear, left side, of the jet boat of FIG. 7.

The general construction of a jet boat 120 in accordance with this invention will now be described with respect to FIGS. 7 and 8. The following description relates to one way of manufacturing a jet boat. Obviously, those of ordinary skill in the jet boat art will recognize that there are other known ways of manufacturing and designing jet boats and that this invention would encompass other known ways and designs.

For simplicity, the components of the jet boat 120 which are similar in nature to the components of the personal watercraft 10 described above will be given the same reference numeral. It should be understood that their specific construction may vary however.

The jet boat 120 has a hull 12 and a deck 14 supported by the hull 12. The deck 14 has a forward passenger area 122 and a rearward passenger area 124. A right console 126 and a left console 128 are disposed on either side of the deck 14 between the two passenger areas 122, 124. A passageway 130 disposed between the two consoles 126, 128 allows for communication between the two passenger areas 122, 124. A door 131 is used to selectively open and close the passageway 130. At least one engine (not shown) is located between the hull 12 and the deck 14 at the back of the boat 120. The engine powers jet propulsion system 84 of the boat 120. The jet propulsion system 84 is of similar construction as the jet propulsion system 84 of the personal watercraft 10 described above, and will therefore not be described in detail here. It is contemplated that the boat 120 could have two engines and two jet propulsion systems 84. The engine is accessible through an engine cover 132 located behind the rearward passenger area 124. The engine cover 132 can also be used as a sundeck for a passenger of the boat 120 to sunbathe on while the boat 120 is not in motion. A reboarding platform 52 is located at the back of the deck 14 for passengers to easily reboard the boat 120 from the water.

The forward passenger area 122 has a C-shaped seating area 136 for passengers to sit on. The rearward passenger area 124 also has a C-shaped seating area 138 at the back thereof. A driver seat 140 facing the right console 126 and a passenger seat 142 facing the left console 124 are also disposed in the rearward passenger area 124. It is contemplated that the driver and passenger seats 140, 142 can swivel so that the passengers occupying these seats can socialize with passengers occupying the C-shaped seating area 138. A windshield 139 is provided at least partially on the left and right consoles 124, 126 and forwardly of the rearward passenger area 124 to shield the passengers sitting in that area from the wind when the boat 120 is in movement. The right and left consoles 126, 128 extend inwardly from their respective side of the boat 120. At least a portion of each of the right and the left consoles 126, 128 is integrally formed with the deck 14. The right console 126 has a recess 144 formed on the lower portion of the back thereof to accommodate the feet of the driver sitting in the driver seat 140 and an angled portion of the right console 126 acts as a footrest 146. A foot pedal 147 is provided on the footrest 146 which may be used to control the jet propulsion system 84 as described in greater detail below. The left console 128 has a similar recess (not shown) to accommodate the feet of the passenger sitting in the passenger seat 142. The right console 126 accommodates all of the elements necessary to the driver to operate the boat 120. These include, but are not limited to, a steering assembly including a steering wheel 148, a throttle operator 76 in the form of a throttle lever, and an instrument panel 152. The instrument panel 152 has various dials indicating the watercraft speed, engine speed, fuel and oil level, and engine temperature. The speed of the watercraft is measured by a speed sensor (not shown) which can be in the form of the speed sensor 106 described above with respect to the personal watercraft 10 or a GPS unit or any other type of speed sensor which could be used for marine applications. It is contemplated that the elements attached to the right console 126 could be different than those mentioned above. The left console 128 incorporates a storage compartment (not shown) which is accessible to the passenger sitting the passenger seat 142.

Turning now to FIGS. 9 to 17, the reverse gate 110 and alternative embodiments thereof will be described in more detail. For simplicity, the components of the reverse gates 210, 310, and 410 which are similar in nature to the components of the reverse gate 110 described below will be given the same reference numeral and will not be described in detail herein with respect to those embodiments.

As seen in FIGS. 9 and 10, the reverse gate 110 has a reverse gate body 154 and two side walls 156 connected to the sides of the reverse gate body 154. The reverse gate body 154 has an inner arcuate surface (not shown in this embodiment), an outer arcuate surface 158, a reverse gate upper edge 160, and a reverse gate lower edge 162 (shown in phantom). Each side wall 156 is provided with an aperture 164. During operation, when the reverse gate 110 is lowered to the fully lowered position as shown, water expelled from the steering nozzle 102 flows along the inner surface of the reverse gate body 154 in a direction from the reverse gate upper edge 160 to the reverse gate lower edge 162 and is redirected towards the front of the watercraft 10, thus causing the watercraft to move in a reverse direction. When the steering nozzle 102 is turned and the reverse gate 110 is in the fully lowered position, a portion of the water expelled from the steering nozzle 102 flows through the aperture 164 corresponding to the direction of rotation of the steering nozzle 102. The water flowing through the aperture 164 creates a lateral thrust which assists in steering the watercraft 10 when moving in the reverse direction. It should be understood that there are other positions of the reverse gate 110 intermediate the fully stowed and fully lowered positions where this would also occur.

The reverse gate 110 is provided with two deflectors 166. The two deflectors 166 are disposed at opposite ends of the reverse gate body 154. Each deflector 166 is connected to one of the side walls 156 and to the outer surface 158 of the reverse gate body 154 via connecting members 168 integrally formed therewith such that the deflector 166 is spaced from the outer surface 158. Each deflector 166, its corresponding connecting members 168, and the outer surface 158 together form a conduit for water to flow through as described below. Each deflector 166 has a deflector leading edge 170 and a deflector trailing edge 172. The surface 174 of the deflector 166 that faces the outer arcuate surface 158 of the reverse gate body 154 is arcuate. When the reverse gate 110 is in the fully lowered position as shown, the deflector trailing edge 172 is disposed upwardly and rearwardly from the deflector leading edge 170, and the deflector leading edge 170 is disposed forwardly and downwardly of the reverse gate lower edge 162. It should be understood that there are other positions of the reverse gate 110 intermediate the fully stowed and fully lowered positions where the deflector trailing edge 172 would also be disposed upwardly and rearwardly from the deflector leading edge 170, and where the deflector leading edge 170 would also be disposed forwardly and downwardly of the reverse gate lower edge 162. When the reverse gate 110 is in the fully lowered position as shown, the deflector leading edge 170 of each deflector 166 is disposed vertically lower than the ride plate 96 by a distance D as shown in FIG. 10. It should be understood that there are other positions of the reverse gate 110 intermediate the fully stowed and fully lowered positions where the deflector leading edge 170 of each deflector 166 would also be disposed vertically lower than the ride plate 96. For the personal watercraft 10, when the reverse gate 110 is in the fully lowered position as shown, the deflector leading edge 170 of each deflector 166 is preferably less than 6 cm below the ride plate 96, and even more preferably between 1 and 3 cm. However, the actual distance by which the deflector leading edge 170 of the deflector 166 extends below the ride plate 86 when the reverse gate 110 is in the fully lowered position will depend on many factors including, but not limited to, the size and position of the deflector(s) 166 and the size and weight of the watercraft 10.

The deflector 166 enhances the ability of the reverse gate 110 to slow down the watercraft 10. When the watercraft 10 is moving forward and the reverse gate 110 is moved to the fully lowered position, water (indicated by arrows 176 in FIGS. 1 and 10) flows over the surfaces 174 of the deflectors 166 and creates a water spray 175 as described in greater detail below. Due to the angle and shape of the deflectors 166, the deflectors 166 generate a drag, indicated by arrow F1, and a down force component, indicated by arrow F2. The drag F1 reduces the speed of the watercraft 10. Also, continuing to operate the jet pump 99 such that water is expelled from the steering nozzle 102 when the reverse gate 110 is in the fully lowered position will, as explained above, redirect the water towards the front of the watercraft 10, which will also help in reducing the speed of the watercraft. However, the drag F1 and the force applied by redirected water are both applied rearwardly of and below the center of gravity of the watercraft 10 which creates a moment about the center of gravity that causes the bow 56 to move down and may cause the front of the deck 14 to go below the water. By having the deflectors 166 angled as shown, the down force component F2 generated on the deflectors 166 creates a moment in the opposite direction which will at least reduce the amount by which the bow 56 moves down. It should be understood that there are other positions of the reverse gate 110 intermediate the fully stowed and fully lowered positions where the deflectors 166 would also generate a drag and a down force component, however the magnitude of the drag and the down force component will vary depending on the actual position. It should be understood that the shape, size, and angle of the deflector can be tailored to generate the desired ratio of drag versus down force being generated.

As seen in FIGS. 1 and 10, when the watercraft 10 is moving forward and the reverse gate 110 is lowered, water flowing rearwardly relative to the hull 12 (as indicated by arrows 176) is deflected by the deflectors 166, flows over a portion of the outer arcuate surface 158 of the reverse gate body 154 and creates a water spray 175. The water spray 175 extends generally vertically above a water level L (FIG. 1) of the body of water in which the watercraft 10 operates and extends behind the watercraft 10. As described above, actuation of the reverse gate 110 results in a deceleration of the watercraft 10, and since the water spray 175 is created by the reverse gate 110 in the lowered position, the appearance of water spray 175 provides a visual indication to users of surrounding watercraft that the watercraft 10 is decelerating. Also, even if users of surrounding watercraft do not know that the appearance of the water spray 175 is associated with a deceleration of the watercraft 10, the appearance of the water spray 175 will increase their awareness of the situation of the watercraft 10 and cause them to manoeuvre carefully with respect to the watercraft 10.

Figure 18:
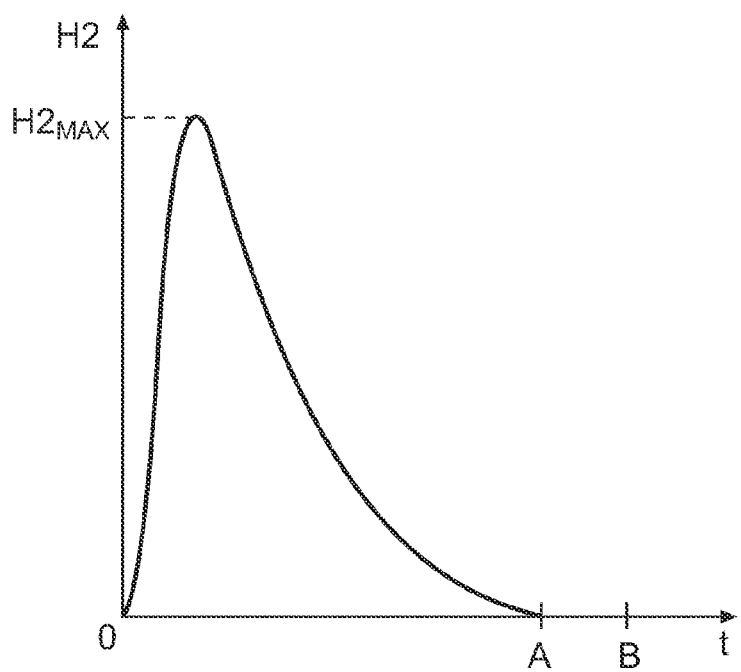
FIG. 18 is a graph illustrating a relation between a height of a water spray created by the reverse gate of the watercraft and a time elapsed from initiation of a deceleration of the watercraft.

FIG. 18 illustrates the relation between a height of the water spray 175 created by the reverse gate 110 of the watercraft 10 and the time elapsed from the initiation of the deceleration of the watercraft 10. As can be seen, upon the lowering of the reverse gate 110 (at time 0), the height H2 of the water spray 175 above the water level L quickly increases until it reaches its maximum height H2max. As the speed of the watercraft 10 reduces over time, so does the height H2 of the water spray 175 since the height H2 of the water spray 175 is proportional to the speed of the watercraft 10 (as shown in the figure, it should be noted that this proportion is not necessarily linear). At, and above, time A, the watercraft 10 is no longer going fast enough for the water being deflected by the deflectors 166 to create the water spray 175 (i.e. the deflected water does not create a spray above the water level L although it may still disrupt the surface of the water). After time B, the watercraft 10 has stopped moving relative to the water in which the watercraft 10 operates. As would be understood, if the reverse gate 110 is moved to a fully stowed position (or a position where the deflectors 166 no longer deflect water) between time 0 and time A, the water spray 175 would no longer be created.

Figure 19:
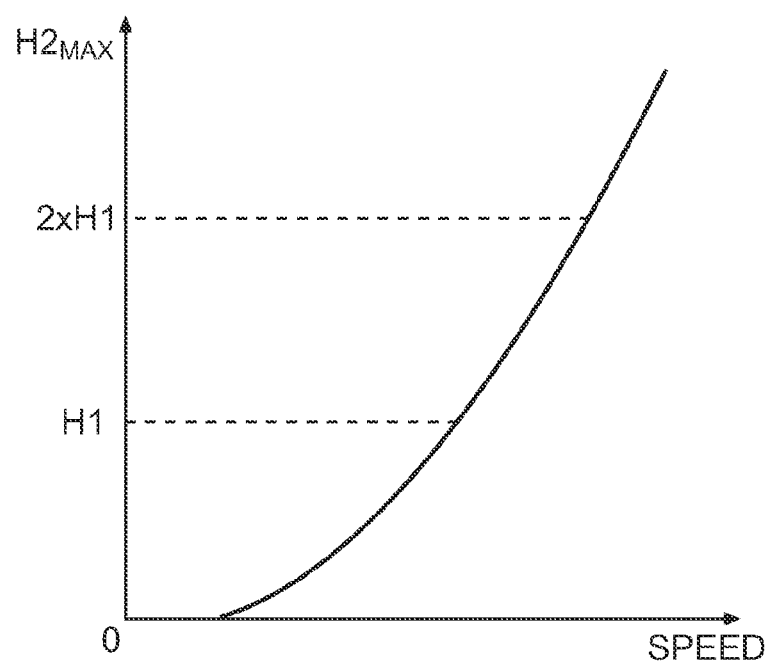
FIG. 19 is a graph illustrating the relation between a maximum height of the water spray created by the reverse gate of the watercraft and a speed of the watercraft upon initiation of the deceleration of the watercraft.

FIG. 19 illustrates the relation between the maximum height H2max of the water spray 175 created by the reverse gate 110 of the watercraft and the speed of the watercraft 10 upon initiation of the deceleration of the watercraft 10. As can be seen, the faster the speed of the watercraft 10 upon the initiation of the deceleration of the watercraft 10, the greater the maximum height H2max of the water spray 175 will be. It can also be seen that, as explained above, for low speeds, no water spray 175 is created, although the surface of the water may still be disrupted by the water being deflected. For certain watercraft speeds, the maximum height H2max of the water spray 175 is higher than the height H1 (FIG. 1) that the watercraft 10 extends above the water level L (i.e. from the water level L to the top of the central helm portion 72). For high speeds, the maximum height H2max of the water spray 175 is higher than twice the height H1 that the watercraft 10 extends above the water level L (2×H1). It is contemplated that the reverse gate 110 and the deflector 166 could be constructed such that the maximum height H2max of the water spray 175 will be less than what is illustrated in FIG. 19, but yet sufficiently high to provide the indication of deceleration.

If the water spray 175 is high enough, it could spray the driver and/or passengers of the watercraft 10. For this reason, the reverse gate 110 includes a spray deflecting element 178 disposed on the outer surface 158 of the reverse gate body 154 to deflect the water away from the rear of the watercraft 10 toward a desired direction which is determined by the shape and size of the deflecting element 178. The spray deflecting element 178 is disposed upwardly of the deflector trailing edge 172 when the reverse gate 110 is in the fully lowered position. It should be understood that there are other positions of the reverse gate 110 intermediate the fully stowed and fully lowered positions where the spray deflecting element 178 would also be disposed upwardly of the deflector trailing edge 172. The spray deflecting element 178 extends laterally along the outer surface 158 of the reverse gate body 154 and extends away from the outer surface 158.

Figure 11:
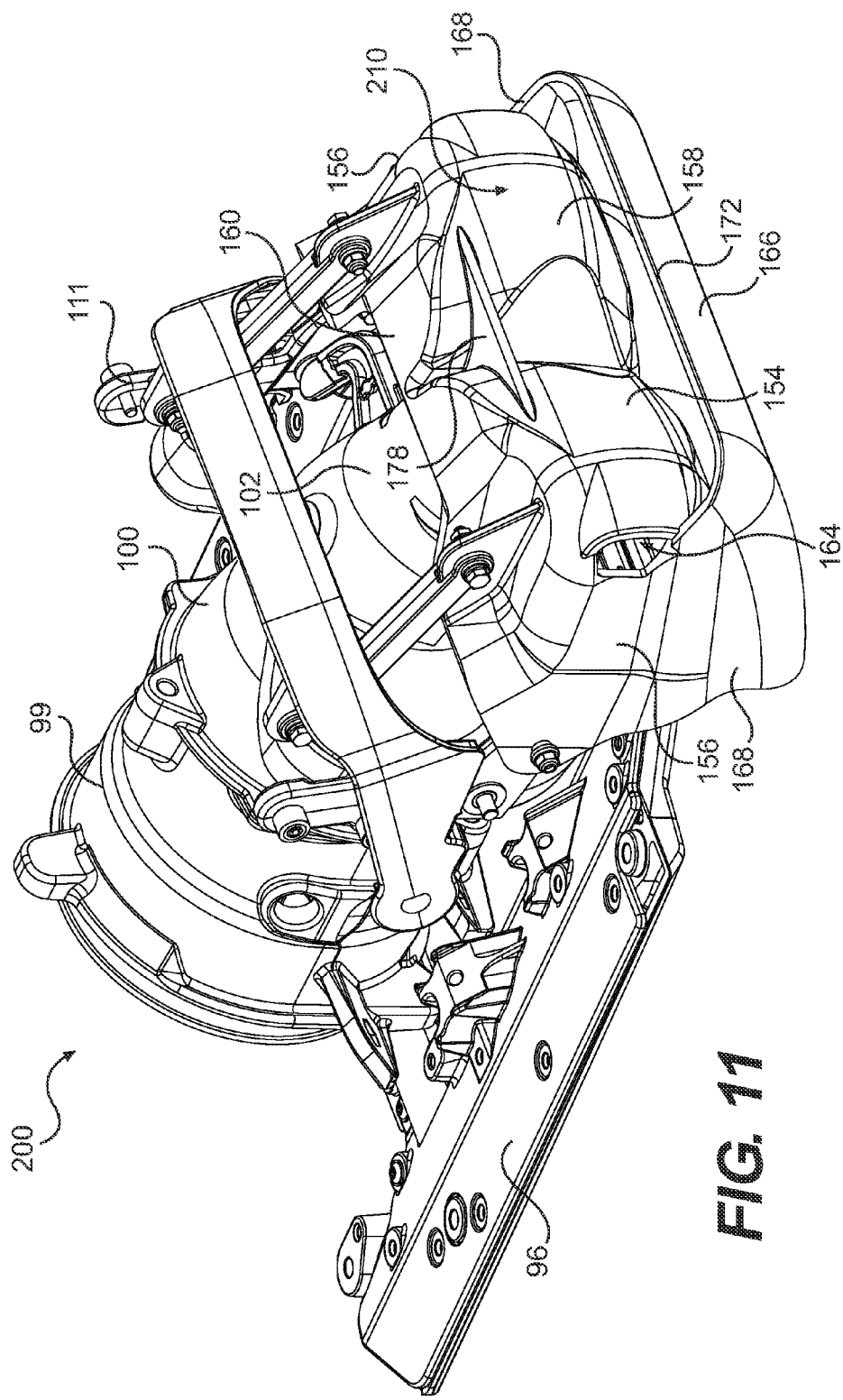
FIG. 11 is a perspective view taken from a rear, left side of a jet propulsion system of the watercraft of FIG. 1 having a second embodiment of a reverse gate.
Figure 12:
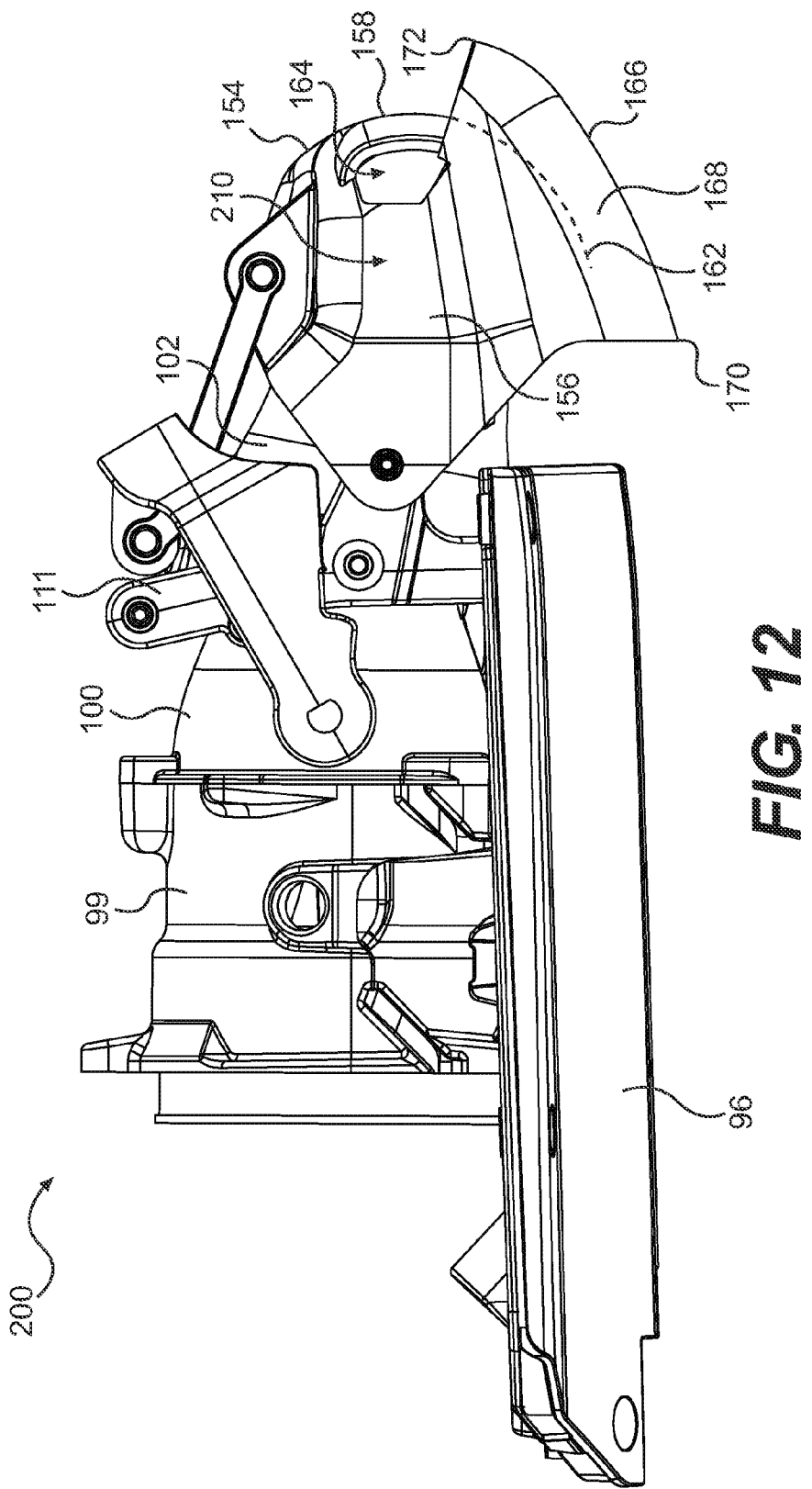
FIG. 12 is a left side view of the jet propulsion system of FIG. 11.
Figure 13:
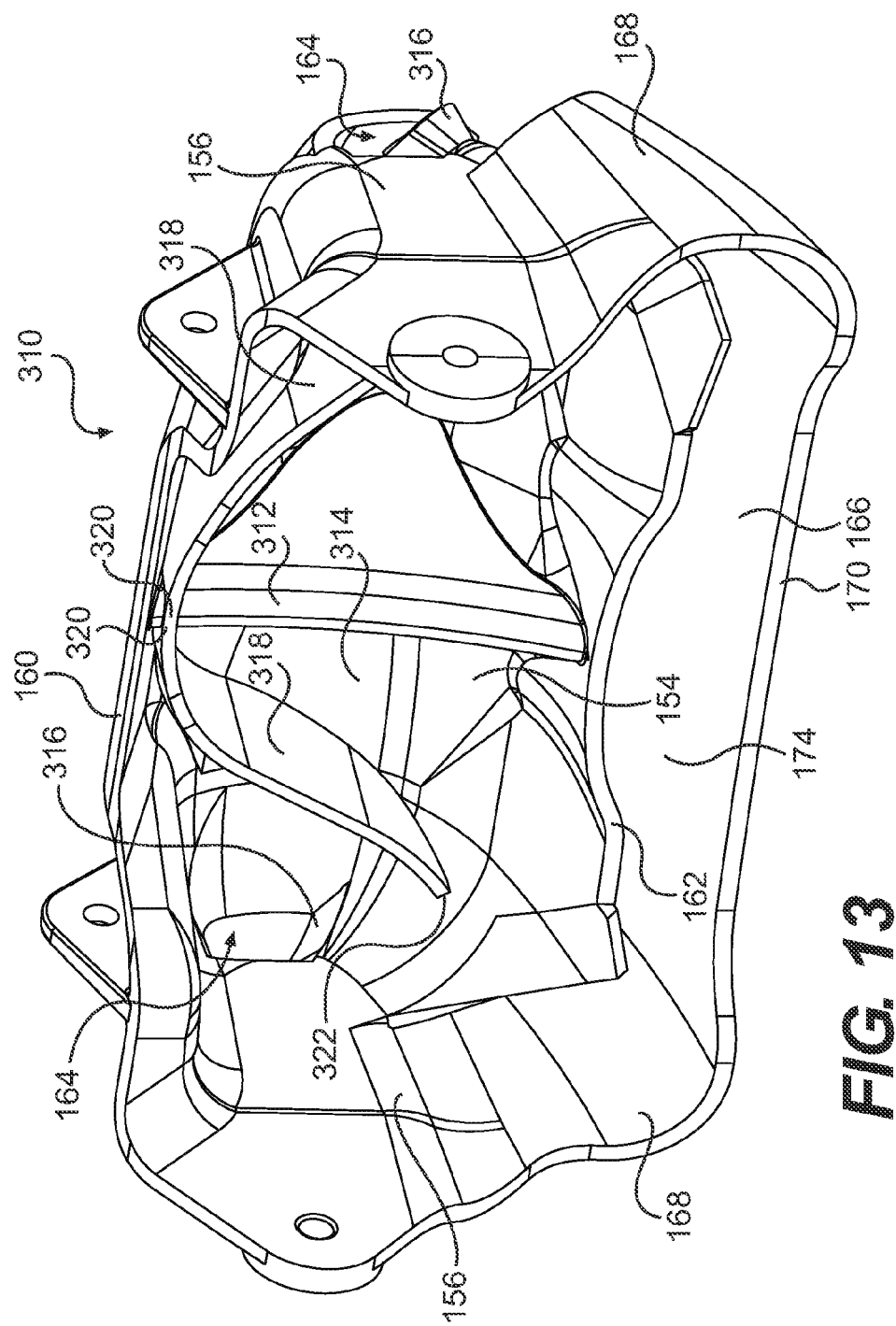
FIG. 13 is a perspective view, taken from a front, left side, of a third embodiment of a reverse gate.
Figure 17:
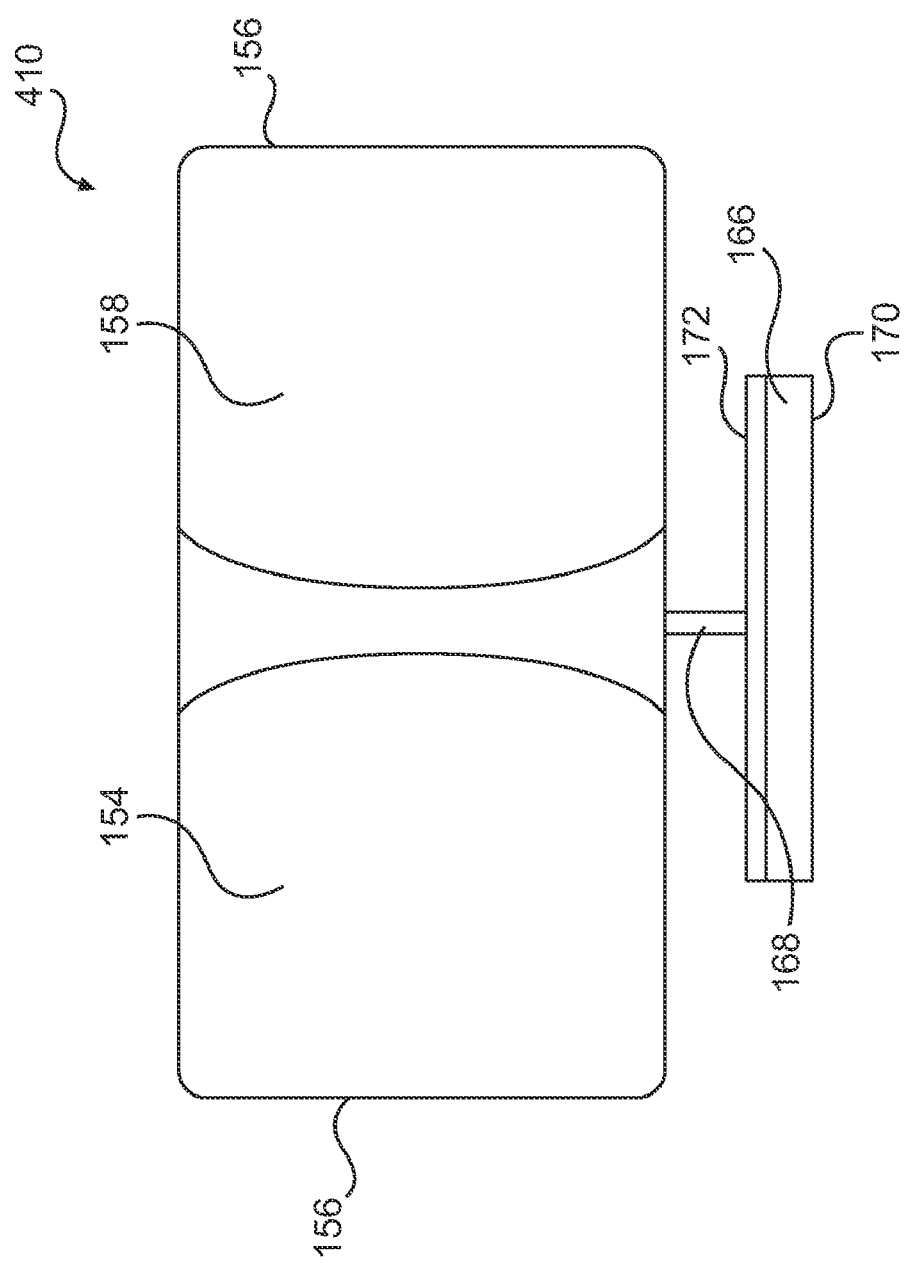
FIG. 17 is a schematic rear view of a fourth embodiment of a reverse gate.

FIGS. 11 and 12 illustrate an alternative embodiment of the jet propulsion system 84. In this embodiment, a jet propulsion system 200 has a reverse gate 210 with a single deflector 166. Other features of the jet propulsion system 200 are the same as those of the jet propulsion system 84 and will therefore not be described in detail. The deflector 166 of the reverse gate 210 is connected to the two side walls 156 via the connecting members 168. Since the deflector 166 of the reverse gate 210 spans the entire width of the reverse gate 210, it creates more drag and down force than the two deflectors 166 of the reverse gate 110. FIGS. 13 to 16 illustrate an alternative embodiment of the reverse gate 210. In this embodiment, a reverse gate 310 also has a single deflector 166 which is connected to the two side walls 156 via the connecting members 168. However, since the deflector 166 of the reverse gate 310 is shorter (from leading edge 170 to trailing edge 172) than the deflector 166 of the reverse gate 210, the deflector 166 of the reverse gate 310 creates less drag and down force than the deflector 166 of the reverse gate 210. FIG. 17 illustrates another alternative embodiment of the reverse gate 210. In this embodiment, a reverse gate 410 has a single deflector 166 which is connected at its center to the lateral center of the outer surface 158 of the reverse gate body 154 by a single connecting member 168. It should be understood that more than one connecting member 168 could be used. The reverse gates 310 and 410 could be used on either of the jet propulsion systems 84 and 200.

Turning now to FIGS. 13 to 16, additional features of the reverse gate 310 will be described. Although not specifically shown in the other embodiments of reverse gates described above (i.e. reverse gates 110, 210, and 410), it is contemplated that these features could be part of these embodiments.

The reverse gate 310 includes a rib 312 that protrudes from the vertically extending central portion (i.e. the portion centered between the side walls 156) of the reverse gate body 154 along the inner arcuate surface 314. The rib 312 extends generally vertically (when the reverse gate 310 is in the fully lowered position) from the reverse gate body upper portion (i.e. the portion of the reverse gate body 154 adjacent the upper edge 160) to the reverse gate body lower portion (i.e. the portion of the reverse gate body 154 adjacent the lower edge 162). The rib 312 splits the jet of water expelled from the steering nozzle 102 so as to distribute the jet of water over the two halves of the reverse gate body 154.

The reverse gate 310 is provided with water deflecting surfaces 316 adjacent the apertures 164 in the side walls 156. The lower portion of each water deflecting surface 316 extends along the lower edge of its corresponding aperture 164 and from there, as seen with the reverse gate 310 in the fully lowered position, extends away from its corresponding side wall 156 and generally upwardly and rearwardly. As previously mentioned, when the watercraft 10 is moving in the forward direction and the reverse gate 310 is lowered while being the watercraft 10 is being steered, the watercraft 10 has a tendency to pitch and roll. The water deflecting surfaces 316 at least partially counteract this tendency. For example, when the steering nozzle 102 is turned towards the left with the reverse gate in the fully lowered position, water flowing out of the aperture 164 in the left side wall 156 is directed partially upwardly (so as to maintain a lateral component to assist in steering) by the left water deflecting surface 316, thus creating a moment in the direction opposite the direction in which the watercraft 10 would have a tendency to pitch and roll. It should be understood that there are other positions of the reverse gate 310 intermediate the fully stowed and fully lowered positions where the water deflecting surfaces 316 would extend generally upwardly and would therefore deflect a flow of water through the apertures 164 partially upwardly.

Figure 14:
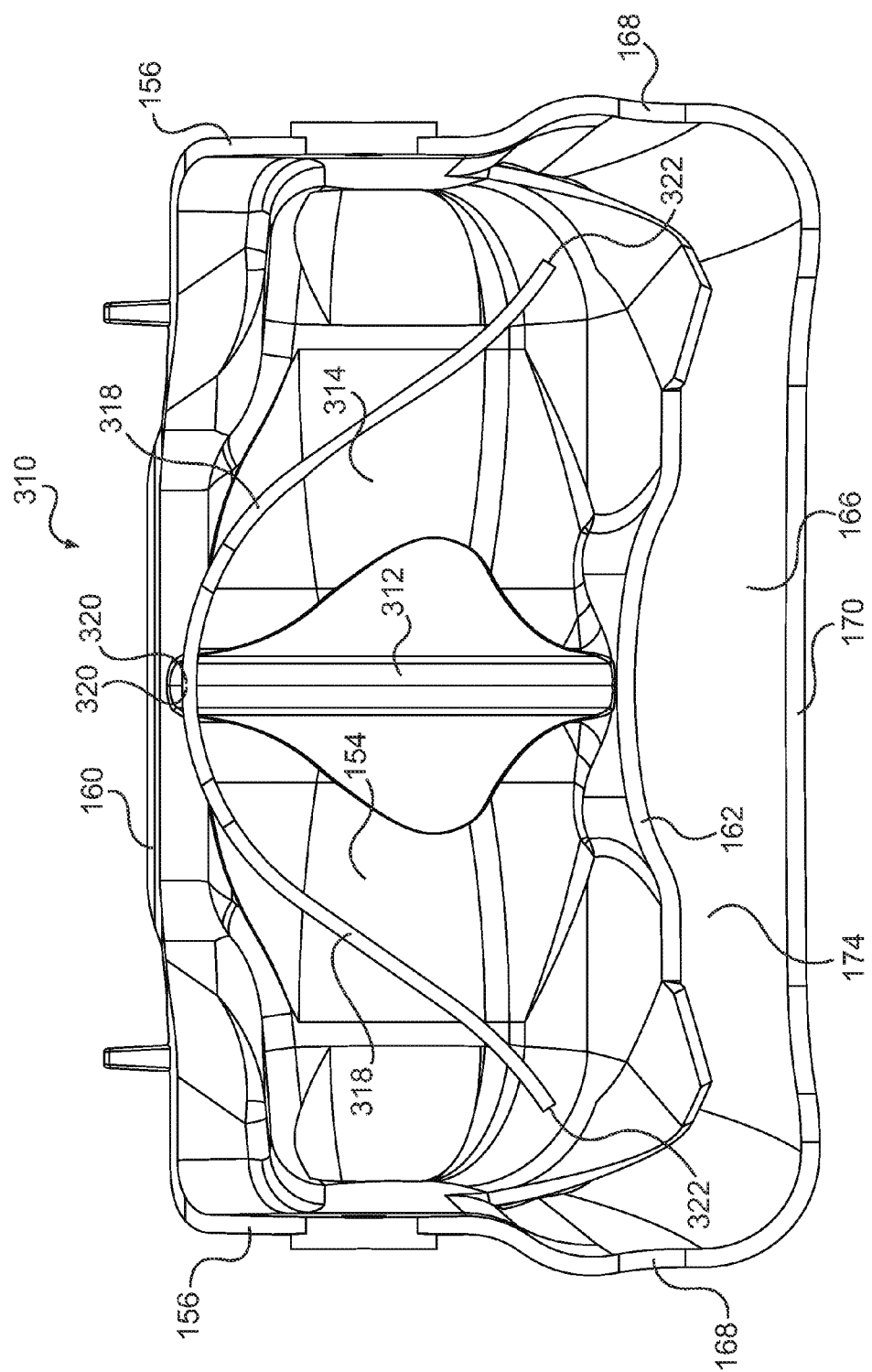
FIG. 14 is a front view of the reverse gate of FIG. 13.
Figure 15:
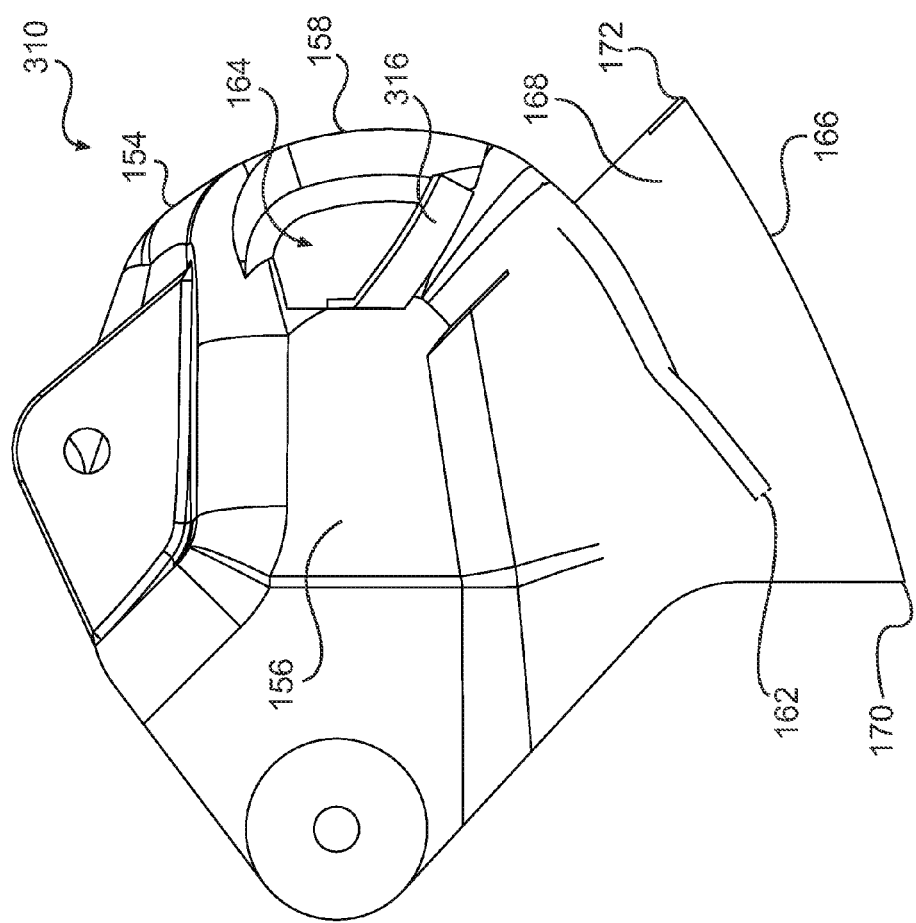
FIG. 15 is a left side view of the reverse gate of FIG. 13.
Figure 16:
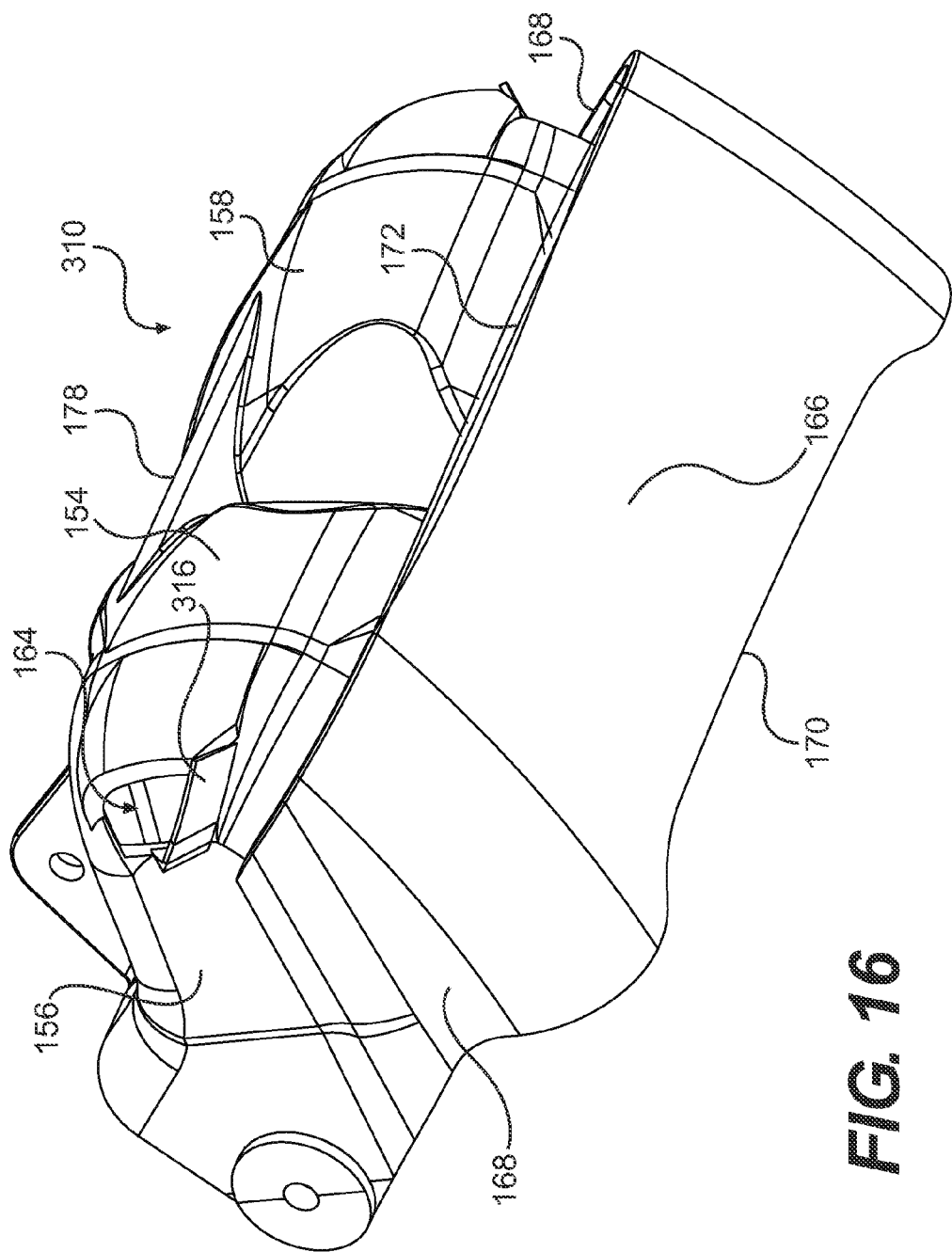
FIG. 16 is a bottom perspective view, taken from a rear, left side, of the reverse gate of FIG. 13.

The reverse gate 310 is also provided with two turning deflectors 318 connected to the inner arcuate surface 314 of the reverse gate body 154. An upper end 320 (as seen in FIG. 14) of each turning deflector 318 is disposed on the reverse gate body upper portion and on the vertically extending central portion of the reverse gate 310. When seen as in FIG. 14, the upper end 320 of each turning deflector 318 is preferably vertically higher than its corresponding aperture 164 (i.e. the upper end 320 of the left turning deflector 318 is vertically higher than the left aperture 164. From its upper end 320, each turning deflector 318 extends downwardly and laterally towards its corresponding side wall 156 as shown, such that the lower end 322 of the turning deflector 318 is closer to the side wall 156 and to the reverse gate lower edge 162 than the upper end 320. When seen as in FIG. 14, the lower end 322 of each turning deflector 318 is preferably vertically lower than its corresponding aperture 164. The upper ends 320 of the turning deflectors 318 are preferably connected to each other as shown, such that the turning deflectors 318 together have a generally inverted U-shape.

When the reverse gate 310 is in the fully lowered position and the steering nozzle 102 is straight, the turning deflectors 318 are disposed around the jet of water being expelled from the steering nozzle 102 so as to prevent most of the water from being expelled through the apertures 164, such that most of the water is redirected by the reverse gate 310 to create rearward thrust. It is contemplated that portions of the jet of water could be above the turning deflectors 318 (as seen in FIG. 14) so that some water would be expelled through the apertures 164. As the steering nozzle 102 is being gradually turned, a gradually increasing portion of the jet of water being expelled from the steering nozzle 102 is disposed above the turning deflector 318 (as seen in FIG. 14) towards which the steering nozzle 102 is being turned, such that a gradually increasing amount of water is expelled through the aperture 164 towards which the steering nozzle 102 is being turned. It should be understood that there are other positions of the reverse gate 310 intermediate the fully stowed and fully lowered positions where this would also occur.

Each of the previously described reverse gates 110, 210, 310, and 410 is preferably manufactured as two parts integrating all of its components which are assembled together. Each part could be made, for example, by using an aluminium die casting or sand casting process process, but other manufacturing processes and materials could be used, such as plastic injection molding. It is contemplated that each part could be made by using a different process.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of indicating a deceleration of a watercraft comprising:
creating a water spray from water flowing under the watercraft rearwardly of a jet pump intake of a jet pump of the watercraft with a reverse gate of the watercraft, the water spray extending above a water level of a body of water in which the watercraft operates, the water spray being created only when the reverse gate of the watercraft is in a lowered position and the watercraft is decelerating.

2. The method of claim 1, wherein when the reverse gate of the watercraft is in the lowered position, the reverse gate redirects a water jet expelled from the jet pump of the watercraft.

3. The method of claim 2, wherein creating the water spray includes causing the water flowing under the watercraft rearwardly of the jet pump intake to flow on a deflector, the deflector being connected to an outer surface of the reverse gate and disposed below the water level when the reverse gate is in the lowered position.

4. The method of claim 3, wherein creating the water spray further includes causing the water to flow on a portion of the outer surface of the reverse gate after flowing on the deflector.

5. The method of claim 4, further comprising deflecting the water flowing on the portion of the outer surface of the reverse gate rearwardly of the watercraft such that the water spray extends away from a rear of the watercraft.

6. The method of claim 1, wherein the watercraft extends a first distance vertically above the body of water; and
wherein the water spray extends a second distance vertically above the body of water, the second distance being greater than the first distance during at least a portion of the deceleration of the watercraft.

7. The method of claim 6, wherein the second distance is at least twice the first distance during the portion of the deceleration of the watercraft.

8. The method of claim 1, wherein a height of the water spray vertically above the body of water is proportional to a speed of the watercraft.

9. The method of claim 1, wherein the water spray extends behind the watercraft.

10. The method of claim 9, wherein the water spray extends generally vertically.

11. The method of claim 1, wherein water forming the water spray never enters a volume formed between a hull and a deck of the watercraft.

12. The method of claim 1, wherein the water spray flows on an outer surface of the reverse gate.

13. A method of indicating a deceleration of a watercraft comprising:
creating a water spray from water flowing under the watercraft rearwardly of a jet pump intake of a jet pump of the watercraft with a reverse gate of the watercraft, the water spray extending above a water level of a body of water in which the watercraft operates, the water spray being created only when decelerating the watercraft.

14. The method of claim 13, further comprising pivoting the reverse gate of the watercraft to a lowered position where the reverse gate redirects a water jet expelled from the jet pump of the watercraft.

15. The method of claim 14, wherein creating the water spray includes causing the water flowing under the watercraft rearwardly of the jet pump intake to flow on a deflector connected to an outer surface of the reverse gate and disposed below the water level when the reverse gate is in the lowered position.

16. The method of claim 13, wherein the watercraft extends a first distance vertically above the body of water; and
wherein the water spray extends a second distance vertically above the body of water, the second distance being greater than the first distance during at least a portion of the deceleration of the watercraft.

17. The method of claim 13, wherein a height of the water spray vertically above the body of water is proportional to a speed of the watercraft.

18. The method of claim 13, wherein the water spray extends generally vertically behind the watercraft.

19. The method of claim 13, wherein the water spray flows on an outer surface of the reverse gate.

20. A watercraft comprising:
a hull having a transom;
a deck disposed on the hull;
an engine disposed between the hull and the deck;
a jet pump intake disposed forwardly of the transom; and
a propulsion system operatively connected to the engine, the propulsion system having a reverse gate, the reverse gate creating a water spray extending rearwardly of the transom above a water level of a body of water in which the watercraft operates, the water spray being created from water flowing under the watercraft rearwardly of the jet pump intake only when the reverse gate of the watercraft is in a lowered position and the watercraft is decelerating.

* * * * *